United States Patent
Choi et al.

(10) Patent No.: US 9,874,633 B1
(45) Date of Patent: Jan. 23, 2018

(54) DECELERATION HYSTERISIS MEASURING APPARATUS FOR SOFT RECOVERY SYSTEM

(71) Applicant: AGENCY FOR DEFENSE DEVELOPMENT, Daejeon (KR)

(72) Inventors: Jae-Hyun Choi, Daejeon (KR); Min-Sup Song, Sejong-si (KR); Jin-Eep Roh, Sejong-si (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 15/588,867

(22) Filed: May 8, 2017

(30) Foreign Application Priority Data

Jul. 14, 2016 (KR) .......................... 10-2016-0089226

(51) Int. Cl.
*G01S 13/58* (2006.01)
*G01S 13/34* (2006.01)
*F42B 35/00* (2006.01)

(52) U.S. Cl.
CPC ............ *G01S 13/584* (2013.01); *F42B 35/00* (2013.01); *G01S 13/341* (2013.01)

(58) Field of Classification Search
CPC ....... G01S 13/584; G01S 13/341; F42B 35/00
USPC ................... 342/106, 109, 112, 128
See application file for complete search history.

(56) References Cited

U.S. PATENT DOCUMENTS

| | | | | |
|---|---|---|---|---|
| 3,940,981 A * | 3/1976 | Covey | ...................... | F41J 13/00 137/624.18 |
| 4,002,064 A * | 1/1977 | Curchack | ................. | F41J 13/00 250/222.2 |
| 4,345,460 A * | 8/1982 | Curchack | ................. | F42B 35/00 73/167 |
| 5,220,128 A * | 6/1993 | Grau | ....................... | F42B 10/06 102/293 |
| 8,994,586 B1 * | 3/2015 | Choi | ...................... | G01S 13/584 342/109 |
| 2008/0231533 A1 * | 9/2008 | Koslover | ............... | H01Q 13/02 343/781 R |
| 2013/0041573 A1 * | 2/2013 | Ochi | ...................... | G01S 13/345 701/117 |
| 2013/0214963 A1 * | 8/2013 | Vacanti | ................... | G01S 7/038 342/120 |
| 2015/0331090 A1 * | 11/2015 | Jeong | ........................ | G01S 7/35 342/83 |

FOREIGN PATENT DOCUMENTS

| | | |
|---|---|---|
| JP | 2003-194924 A | 7/2003 |
| KR | 10-2005-0008325 A | 1/2005 |
| KR | 10-1392337 B1 | 5/2014 |

OTHER PUBLICATIONS

Il-Yong Yu et al., "Initial Design of a Small Scale Soft Recovery System for High Speed Projectiles," The Korean Society for Aeronautical and Space Sciences, Nov. 2004, pp. 783-787.

* cited by examiner

*Primary Examiner* — Marcus E Windrich
(74) *Attorney, Agent, or Firm* — LRK Patent Law Firm

(57) ABSTRACT

A deceleration hysteresis measuring apparatus for a soft recovery system is configured to transmit an electromagnetic wave to a pressure tube of the soft recovery system and receive the electromagnetic wave reflected from a projectile moving in the pressure tube so as to measure a distance of the projectile based on signals of the transmitted and received waves.

8 Claims, 3 Drawing Sheets

DECELERATION HYSTERISIS MEASURING APPARATUS FOR SOFT RECOVERY SYSTEM

CROSS REFERENCE TO RELATED APPLICATION(S)

This application claims the benefit of Korean Patent Application No. 10-2016-0089226, filed Jul. 14, 2016, which is hereby incorporated by reference in its entirety into this application.

BACKGROUND OF THE INVENTION

1. Technical Field

The present disclosure relates generally to a deceleration hysteresis measuring apparatus for a soft recovery system and, more particularly, to a deceleration hysteresis measuring apparatus that is installed in a soft recovery system to measure hysteresis of deceleration in velocity of a projectile moving at high speed in the soft recovery system.

2. Description of the Related Art

As well known to those skilled in the art, a soft recovery system is a ballistic compression decelerator that converts kinetic energy of a high-speed projectile such as shells to thermal energy using one or more pressure tubes. A deceleration rate can be regulated with adjustment in pressure(s) within the tube(s) depending on velocity and weight of a projectile.

One or more diaphragms are provided in the tube, wherein the pressure tube is precharged to a high pressure to minimize a deceleration distance so that the diaphragm(s) may be caused to burst due to the pressure in front of the diaphragm that is being elevated when the projectile approaches the diaphragm. That is, the soft recovery system is used for recovering a fired projectile at a relatively short distance.

Major components employed to a fuze sensor for mounting to a shell have to be made smaller due to a restricted design of the shell, and require a normal operation even in high shock environments such as a shell-firing environment. That is, a sensor system and components thereof should be initially designed, taking account of shock resistance, in order to satisfy shock resistance as well as their own functions.

Thus, in order to simulate the acceleration and shock generated on course correction fuzes and smart munitions (precision guided missiles, glide munitions, etc.) during the firing thereof and check the survivability of the core components (actuation system, electronic part, etc.) thereof, it is essentially required to mount the components on a test specimen projectile, and to fire, decrease, and recover the test specimen projectile without any damage in a soft recovery system. Here, the test specimen projectile is designed so that an external shape thereof has the same shape as that of a target shell, but the inside thereof is capable of mounting the system or components to be tested.

A conventional deceleration hysteresis measuring apparatus employed by a soft recovery system includes a multichannel accelerometer and a data storage device. That is, such a conventional measuring apparatus is mounted in a test specimen projectile, which then is fired and recovered in the soft recovery system, and deceleration hysteresis measured and stored by the measuring apparatus is checked.

Deceleration hysteresis data measured by the deceleration hysteresis measuring apparatus can be used in numerical analysis simulation as well as dynamic test for a projectile so as to optimize pressure in the pressure tube, burst pressure of a diaphragm, etc. according to velocity and weight of the projectile.

However, since a system or components thereof for checking shock resistance and a conventional deceleration hysteresis measuring apparatus cannot be mounted on the same position in the test specimen projectile, there is a limit to measure in real-time deceleration hysteresis of the system or components mounted in the test specimen projectile.

Assuming the case where a test specimen projectile may often be stopped in any of pressure tubes during the recovery test if the pressures of the pressure tubes are not optimized depending on velocity and weight of the projectile, it may be difficult to check the position of the stopped projectile, since the conventional measuring apparatus only measures deceleration. Accordingly, the recovery system cannot be repaired easily.

The foregoing is intended merely to aid in the understanding of the background of the present invention, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an object of the present disclosure is to provide a deceleration hysteresis measuring apparatus for a soft recovery system, wherein the apparatus is capable of real-time measurement of deceleration hysteresis of a test specimen projectile tested by the soft recovery system.

In order to accomplish the above object, the present disclosure provides a deceleration hysteresis measuring apparatus for a soft recovery system, the apparatus configured to transmit an electromagnetic wave to a pressure tube of the soft recovery system and receive the electromagnetic wave reflected from a projectile moving in the pressure tube so as to measure a distance of the projectile based on transmitted and received signals of the transmitted and received electromagnetic waves.

The deceleration hysteresis measuring apparatus may include: a feeder unit transmitting the electromagnetic wave to the pressure tube and receiving the reflected electromagnetic wave therefrom; a transceiver unit generating a frequency-modulated continuous-wave (FMCW) or a continuous-wave transmitted from the feeder unit and mixing the signal transmitted from the feeder unit and the signal reflected from the projectile in the pressure tube and received by the feeder unit so as to extract an intermediate frequency from the mixed signals; a modulation/demodulation unit modulating/demodulating the extracted intermediate frequency for remote communication; a signal processing unit receiving a signal from the modulation/demodulation unit to extract a beat frequency or a Doppler frequency; and a user interface calculating the extracted beat frequency or Doppler frequency to output the distance or velocity of the projectile.

The deceleration hysteresis measuring apparatus may preferably be disposed towards an inlet of the pressure tube.

The feeder unit may have a frequency band of 1.3 GHz to allow for excitation of only a dominant mode depending on a diameter of the pressure tube.

The feeder unit may include a WR-650 type circular waveguide.

The transceiver unit may include: a reference clock signal generator generating a reference clock; a direct digital synthesizer generating the FMCW or the continuous-wave; a coupler dividing output signals from the direct digital synthesizer according to a transmitting path and a receiving path; a circulator transmitting output signals from the direct digital synthesizer via the feeder unit and receiving signals reflected from the projectile in the pressure tube and received by the feeder unit while separating the transmitting signal; and a down-converter mixing signals separated according to the receiving path by the coupler and signals received by the circulator so as to down-convert the mixed signals to the intermediate frequency.

The signal processing unit may control the direct digital synthesizer to allow the transceiver unit to generate the FMCW or the continuous-wave.

The signal processing unit may extract a lowest beat frequency or a highest beat frequency exceeding a threshold, taking account of frequency dispersion in the pressure tube when extracting the beat frequency.

The velocity and deceleration of the projectile may be calculated from the calculated distance of the projectile.

The position of the projectile in the pressure tube may be output from the calculated distance of the projectile.

According to the deceleration hysteresis measuring apparatus for a soft recovery system, it is possible to measure in real time using electromagnetic waves distance, velocity, and deceleration of a projectile moving at high speed in the soft recovery system.

Thus, measured deceleration hysteresis data can be used for numerical analysis simulation as well as dynamic testing of a projectile so as to optimize the pressure within the pressure tube, burst pressure of diaphragms according to velocity, and weight of the projectile.

Further, even in a case where a projectile is jammed and stopped in the pressure tube of the soft recovery system, the position of the projectile can be checked from a measured distance of the projectile, thereby facilitating maintenance of the soft recovery system.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
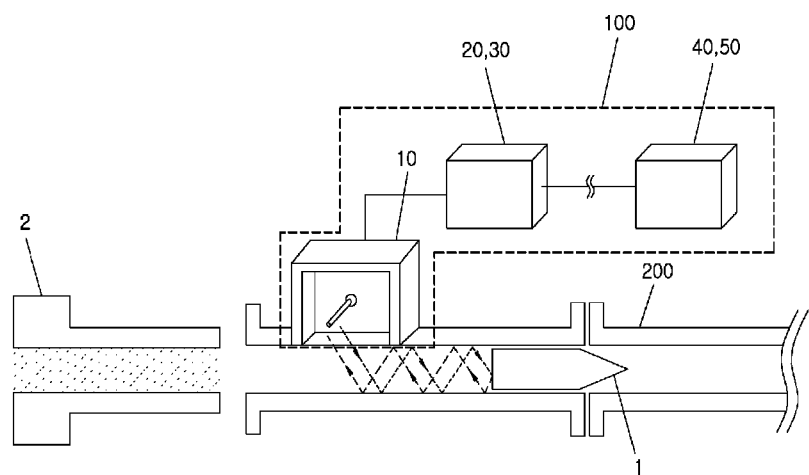
FIG. 1 is a conceptual view of a deceleration hysteresis measuring apparatus for a soft recovery system according to an embodiment of the present disclosure.

Reference should be made to the accompanying drawings and relevant description thereof for illustrating embodiments of the present disclosure in order to fully understand the present disclosure and operative advantages and objectives thereof.

Repeated descriptions and descriptions of known functions and configurations that have been deemed to make the gist of the present disclosure unnecessarily obscure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated to make the description clearer.

Figure 2:
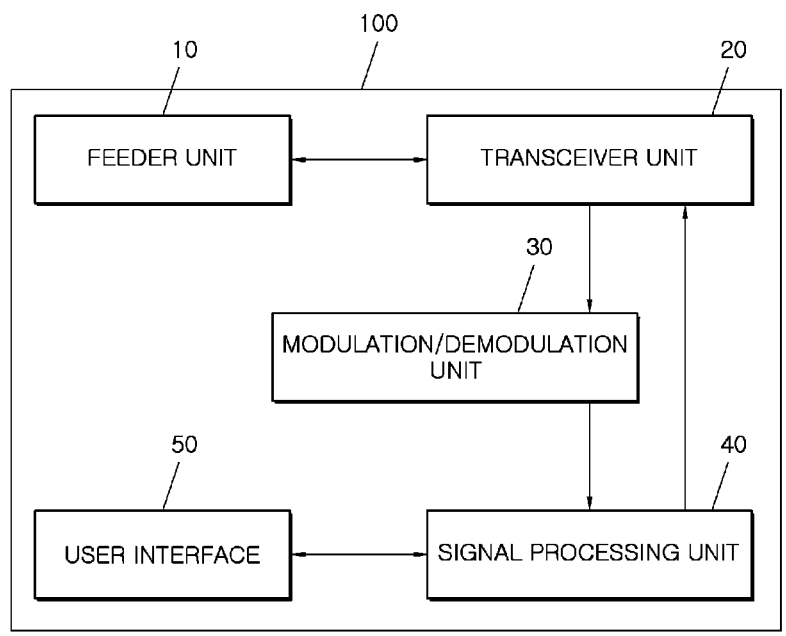
FIG. 2 is a block diagram of the deceleration hysteresis measuring apparatus.
Figure 3:
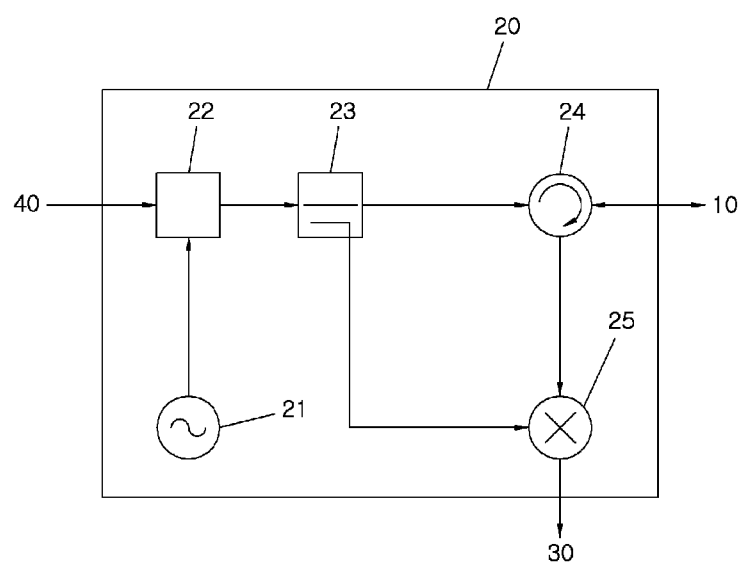
FIG. 3 is a block diagram of a transceiver unit as one of elements of the deceleration hysteresis measuring apparatus.

FIG. 1 is a conceptual view of a deceleration hysteresis measuring apparatus for a soft recovery system according to an embodiment of the present disclosure, FIG. 2 is a block diagram of the deceleration hysteresis measuring apparatus, and FIG. 3 is a block diagram of a transceiver unit as one of elements of the deceleration hysteresis measuring apparatus.

Hereinafter, the deceleration hysteresis measuring apparatus 100 for a soft recovery system will be described with reference to FIGS. 1 to 3.

A projectile 1 fired from a gun 2 advances into a pressure tube 200 of the soft recovery system. Here, in order to only simulate the acceleration and shock of the projectile fired into a space, a barrel of the gun 2 and the pressure tube 200 should be provided in alignment and a diameter of the pressure tube 200 is substantially the same as that of the projectile 1 so as to minimize the generation of unnecessary secondary shock in the pressure tube 200.

Further, the pressure tube 200 should be designed to have a length long enough to minimize sudden deceleration of the projectile 1 in the soft recovery system.

The pressure tube 200 may adopt a circular waveguide having a similar diameter to that of the projectile 1. Thus, the deceleration hysteresis measuring apparatus 100 may be disposed in proximity to an inlet of the soft recovery system such that an electromagnetic wave transmitted by the apparatus is reflected and returned from a base part of the projectile 1.

The reflected and returned signal is received by the deceleration hysteresis measuring apparatus 100, which can then measure a distance or velocity of the projectile 1 with a principle of a so-called 'radar' using a correlation between a transmitted signal and a received signal.

Here, in the case of the circular waveguide, there are characteristics in which a variety of waveguide modes (transverse electric (TE) mode, transverse magnetic (TM) mode, etc.) may be provided in a waveguide according to frequencies of an electromagnetic wave to be used, and in which even in a single mode, group velocity of a wave in the waveguide may vary according to frequencies of the wave. Thus, it is very important to determine which band of frequency is used in the deceleration hysteresis measuring apparatus 100.

Referring to FIG. 2, the deceleration hysteresis measuring apparatus 100 includes a feeder unit 10, a transceiver unit 20, a modulation/demodulation unit 30, a signal processing unit 40, and a user interface 50.

The feeder unit 10 transmits and receives an electromagnetic wave to and from the pressure tube 200 of the soft recovery system.

Since a projectile 1 to be used has a diameter of about 155 mm, a diameter of the pressure tube 200 also has a similar value.

When higher waveguide modes are provided in the pressure tube according to frequencies, group velocity is different for respective modes, making it difficult to precisely measure the velocity or distance of the projectile 1.

Thus, when the pressure tube 200 has a diameter of 155 mm, the frequency of the feeder unit 10 preferably has a frequency band of 1.3 GHz to allow for excitation of the dominant mode only.

Here, the dominant mode means a mode whose cutoff frequency is lowest, so a lower frequency than the cutoff frequency does not propagate in the waveguide.

Further, the feeder unit 10 may preferably employ a WR-650 type circular waveguide.

The transceiver unit 20 generates a frequency-modulated continuous-wave (FMCW) or a continuous-wave, transmits the same via the feeder unit 10, and mixes the signal transmitted from the feeder unit and the signal reflected from the projectile 1 in the pressure tube 200 and received by the feeder unit 10 so as to extract an intermediate frequency from the mixed signals.

The transceiver unit 20 includes: a reference clock signal generator 21 generating a reference clock; a direct digital synthesizer 22 generating the FMCW or the continuous-wave; a coupler 23 dividing output signals from the direct digital synthesizer according to a transmitting path and a receiving path; a circulator 24 transmitting output signals from the direct digital synthesizer to the feeder unit 10 and receiving signals reflected from the projectile 1 in the pressure tube 200 and received by the feeder unit 10 while separating the transmitting signal; and a down-converter 25 mixing signals separated according to the receiving path by the coupler 23 and signals received by the circulator 24 so as to down-convert the mixed signals to the intermediate frequency.

When the FMCW is used, the intermediate frequency is considered a beat frequency, and when the continuous-wave is used, the intermediate frequency is considered a Doppler frequency.

The modulation/demodulation unit 30 is used for remote communication of the extracted intermediate frequency. Since explosion-induced pressure and noise are generated a lot at a position near the deceleration hysteresis measuring apparatus 100 when a projectile 1 is fired, a measuring operation can be performed safely via remote communication.

The signal processing unit 40 controls the direct digital synthesizer 22 to allow the transceiver unit 20 to generate the FMCW or the continuous-wave.

The signal processing unit 40 receives a signal from the modulation/demodulation unit 30 and extracts the beat frequency or the Doppler frequency.

Here, when the FMCW is used, the beat frequency may be dispersed in a frequency domain since there is frequency dispersion in the pressure tube 200 depending on a modulated bandwidth, whereas in the case of the continuous-wave using a single frequency, the Doppler frequency may not be dispersed in the frequency domain.

Thus, the FMCW or continuous-wave may be selectively used. In addition, the signal processing unit 40 can extract a lowest or highest beat frequency exceeding a threshold, taking account of frequency dispersion in the pressure tube 200 when extracting the beat frequency.

The user interface 50 calculates the extracted beat frequency or Doppler frequency to output the distance, velocity, and deceleration of the projectile 1.

The velocity is calculated by differentiation of the measured distance, and the deceleration is calculated by differentiation of the velocity.

Further, the user interface 50 can find and illustrate a precise position of a projectile 1 from the measured distance of the projectile even when the projectile is jammed and stopped in the pressure tube.

According to the foregoing configuration, the deceleration hysteresis measuring apparatus can measure in-real time using electromagnetic waves a distance, velocity, and deceleration of a projectile moving at high speed in the soft recovery system, and the measured deceleration hysteresis data can be used in numerical analysis simulation as well as dynamic test of a projectile for optimizing pressure in the pressure tube, burst pressure of a diaphragm, etc. according to velocity and weight of a projectile.

Although the preferred embodiments of the present disclosure have been disclosed for illustrative purposes, those skilled in the art will appreciate that various modifications, additions and substitutions are possible, without departing from the scope and spirit of the invention as disclosed in the accompanying claims. Therefore, those skilled in the art will appreciate that various modifications and other equivalent embodiments are possible from the embodiments, and the technical scope of the present disclosure should be defined by the technical spirit of the claims.

What is claimed is:

1. A deceleration hysteresis measuring apparatus for a soft recovery system to measure a distance of a projectile moving in a pressure tube of the soft recovery system, the apparatus comprising:

a feeder unit transmitting an electromagnetic wave to the pressure tube of the soft recovery system and receiving an electromagnetic wave reflected from the projectile moving in the pressure tube of the soft recovery system;

a transceiver unit generating a frequency-modulated continuous-wave (FMCW) or a continuous-wave, which is to be transmitted through the feeder unit, mixing a signal of the electromagnetic wave transmitted from the feeder unit and a signal of the electromagnetic wave reflected from the projectile in the pressure tube and received by the feeder unit, and extracting an intermediate frequency from the mixed signals;

a modulation/demodulation unit modulating/demodulating the extracted intermediate frequency for remote communication;

a signal processing unit receiving a signal from the modulation/demodulation unit to extract a beat frequency or a Doppler frequency; and a user interface calculating the extracted beat frequency or Doppler frequency to output the distance of the projectile, wherein the deceleration hysteresis measuring apparatus is disposed in proximity to an inlet of the soft recovery system.

2. The deceleration hysteresis measuring apparatus of claim 1, wherein the feeder unit has a frequency band of 1.3 GHz to allow for excitation of only a dominant mode depending on a diameter of the pressure tube.

3. The deceleration hysteresis measuring apparatus of claim 1, wherein the feeder unit comprises a WR-650 type circular waveguide.

4. The deceleration hysteresis measuring, apparatus of claim 1, wherein the transceiver unit comprises:

a reference clock signal generator generating a reference clock;

a direct digital synthesizer generating the FMCW or the continuous-wave;

a coupler dividing output signals from the direct digital synthesizer according to a transmitting path and a receiving path;

a circulator transmitting output signals from the direct digital synthesizer to the feeder unit and receiving signals reflected from the projectile in the pressure tube and received by the feeder unit while separating the transmitted signal; and a down-converter mixing signals separated according to the receiving path by the coupler and signals received by the circulator and down-converting the mixed signals to the intermediate frequency.

5. The deceleration hysteresis measuring apparatus of claim 4, wherein the signal processing unit controls the direct digital synthesizer to allow the transceiver unit to generate the FMCW or the continuous-wave.

6. The deceleration hysteresis measuring apparatus of claim 1, wherein the signal processing unit extracts the beat frequency, and extracts a lowest beat frequency or a highest beat frequency exceeding a threshold taking account of frequency dispersion in the pressure tube.

7. The deceleration hysteresis measuring apparatus of claim 1, wherein velocity and deceleration of the projectile are calculated from the calculated distance of the projectile.

8. The deceleration hysteresis measuring apparatus of claim 1, wherein a position of the projectile in the pressure tube is output from the calculated distance of the projectile.

\* \* \* \* \*